July 22, 1969
F. J. PAVLIK
3,456,826
FREE MOVABLE SKID
Filed Aug. 25, 1966
2 Sheets-Sheet 1
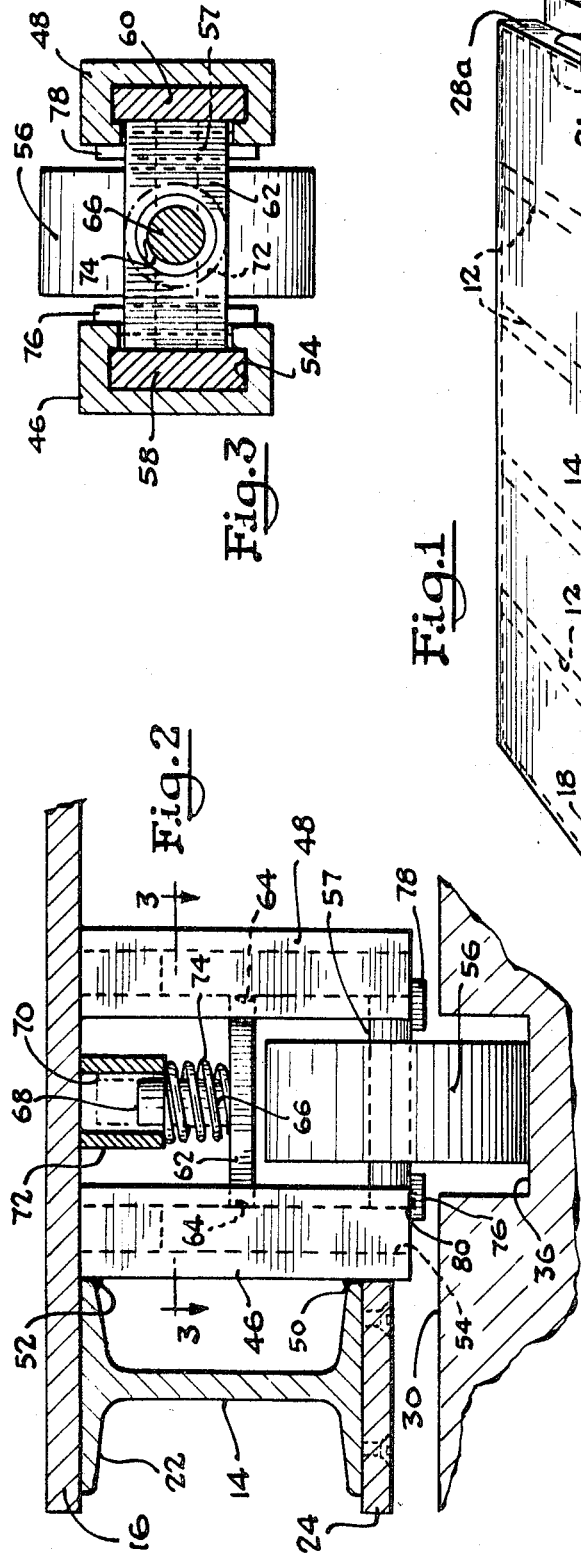
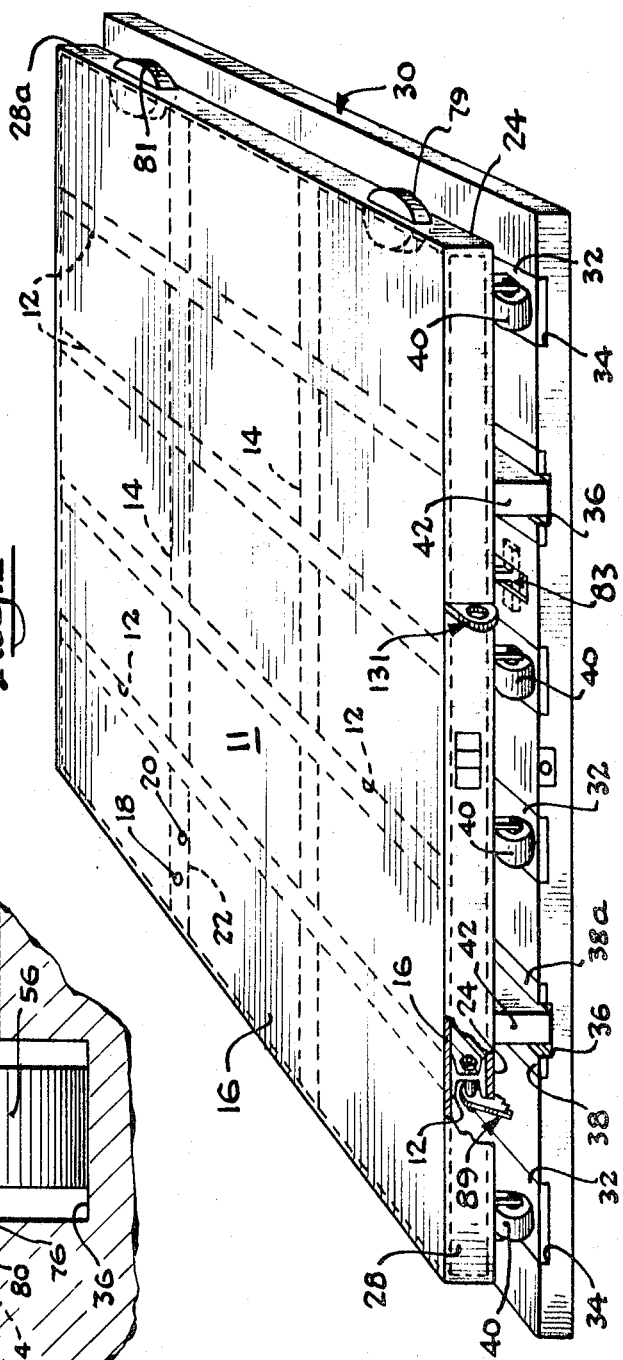
Inventor
Frank J. Pavlik
By Burmeister & Kulie
Attorneys July 22, 1969
F. J. PAVLIK
3,456,826
FREE MOVABLE SKID
Filed Aug. 25, 1966
2 Sheets-Sheet 2
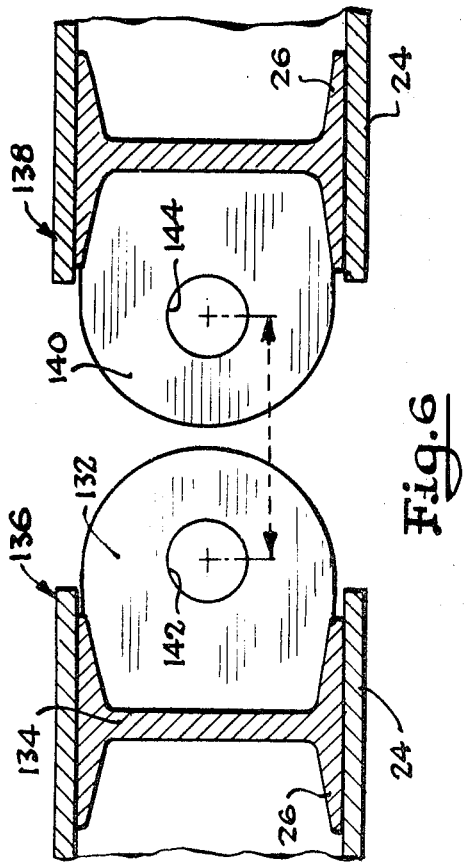
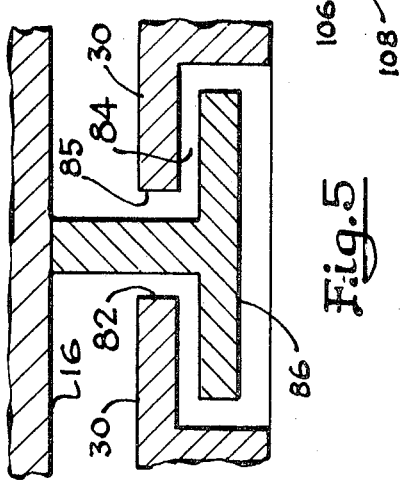
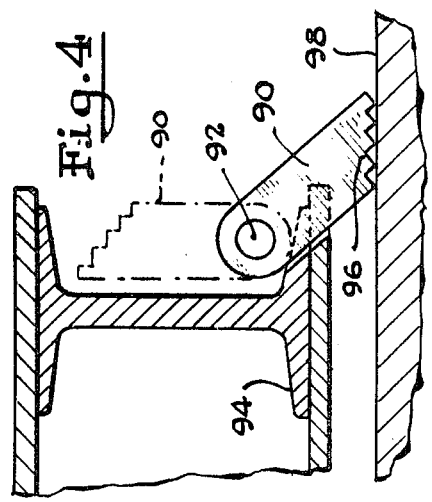
Inventor
Frank J. Pavlik
By Burmeister & Kulie
Attorneys 3,456,826
FREE MOVABLE SKID
Frank J. Pavlik, 3504 W. 74th St., Chicago, Ill. 60629
Filed Aug. 25, 1966, Ser. No. 575,003
Int. Cl. B60p 1/64
U.S. Cl. 214—515                                    3 Claims

ABSTRACT OF THE DISCLOSURE

A device for facilitating transporting of objects on cargo carriers, such as trucks, including a skid or palette including rollers for engaging the floor of the cargo carrier is disclosed. The cargo carrier is provided with recessed tracks for engaging spring loaded rollers and guiding the palettes onto and off of the cargo carrier. In addition, the palettes are provided with means for securing them in position on the cargo carrier, and one embodiment of the invention provides a rack and pinion device for engaging the side walls of the cargo carrier to prevent lateral sway. Another embodiment of the invention utilizes a depending I-beam slidably disposed in a slot in the floor of the carrier.

---

This invention relates to a movable skid which is particularly adapted to be mounted and removed from carriers; and further relates to a skid and carrier assembly.

Skids or palettes are commonly provided with rollers to facilitate transport, especially when heavy loads are placed on the skids. In many uses skids or palettes are designed to be placed on various carriers, and various means have been designed to securely mount the skid on the carrier. Many difficulties have been involved in securing such skids with means such as chains, anchoring brackets and the like.

It has also been desirable to provide a supporting base or platform which could operate both as a skid and a rollable palette or truck. Such a structure would find particular acceptability where versatile and speedy operations are required such as loading and unloading comestibles for large food stores such as supermarkets.

Particular advantages are realized where tthe skid can be quickly mounted on a carrier, be efficiently secured so the load remains stable during transport, and then be quickly and easily dismounted at the point of delivery. It is a further advantage if such a palette or platform can be wheeled in a conventional manner on a supporting structure for unloading.

It is, therefore, one principal object of this invention to provide a freely movable palette which can be efficiently transported by a carrier.

It is another object to provide a palette with guide means which allow said palette to be both easily and securely mounted on a carrier with or without heavy loads for transport to loading and delivery points.

Still another object is a palette which permits large loads to be quickly removed by pulling the load by a cable winch or the like away from guiding and securing means onto an elevator platform or the like.

Another object is a skid and carrier assembly in which a floor portion of the carrier is modified to quickly, simply and easily guide and secure a loaded skid.

Another object is a skid and carrier assembly in which adjustable side means in the skid secure said skid against sway in a carrier. Another object is a skid and carrier assembly wherein braking means may be used to secure the skid in the carrier against undesirable front and back or lateral movement.

Another object is a skid and carrier assembly in which a plurality of skids can be interlocked while still being quickly mountable in guiding and securing means.

Another object is a skid and carrier assembly in which adjustable guide means on the skid assure contact with complementary guide means on the carrier to obtain a sufficient level of guiding and securing action under various loads or no loads.

The foregoing objects are attained together with other objects which will occur to the practitioner from considering the following disclosure of the invention which includes drawings wherein:

FIGURE 1 is a more or less schematic perspective of a skid and carrier assembly;

FIGURE 2 is a side elevation, on an enlarged scale, of an adjustable guide means on the skid;

FIGURE 3 is a schematic top plan of the adjustable means shown in FIGURE 2;

FIGURE 4 is a side view with parts removed of a snapdown brake means to hold the palette against movement;

FIGURE 5 is a schematic side view with parts removed of an interlock between the skid and the floor portion of the carrier;

FIGURE 6 is a side view with parts removed of an interlock between two skids; and FIGURE 7 is a schematic side elevation with parts removed of means to adjust the side-to-side extension of the skid.

The use of the same reference numbers in the various views will indicate reference to the same structures and parts.

Referring to the drawings, a skid shown generally as 10 may be variously constructed to meet different demands in service, and the illustrated form is a heavy duty palette body having a plurality of crossing I beam members, one of which is shown at 12, extending from front to back; and another which is shown at 14 extending from side to side. The beams may be suitably welded to one another at points of intersection.

A top planar wall 16 may be fastened to the top flanges of the I beams such as by sunken bolts, several of which are indicated at 18, 20 to hold the top wall 16 to a top flange 22. A similar bottom wall 24 may be fastened in a like manner to the bottom flanges 26 of the I beams. Side edges or side walls 28 are shown connecting the top and bottom walls, and may be fastened to the ends of the I beams by known means which are not shown.

The skid 10 is adapted to be used with a carrier which may be any one associated with different modes of transport, such as railroad freight, air freight, ship freight, and other vehicular modes of travel. The drawings schematically and generally indicate a cooperative floor portion of such a carrier at 30. For convenience, reference will be made to this part as a truck trailer floor portion because such an assembly is particularly adapted to widespread use.

The floor portion 30 of the trailer truck is shown with a plurality of guide means adapted to coact with complementary guide means connected to the bottom wall 24 of the palette body of the skid. The floor portion guide means are shown as elongated, wear-resistant members or slats 32 mounted flush with floor portion 30. These may be steel slats seated and fixed in matching grooves 34. Other floor portion guide means are shown as recessed tracks or grooves 36. Such recessed tracks may be lined with wear-resistant material and may have hard metal strips 38 and 38a fitted at the opposite sides of the recessed track to reduce wear in use.

The floor portion guide means are adapted to coact with means connected to the bottom wall 24 of the skid. A fixed roller 40 is adapted to engage track 32. Rollers 40 are preferably permanently fixed in position to the bottom wall 24 of the skid by any means which, however, are not shown. The bottom 24 of the skid is provided with plural sets of rollers 40, all the rollers in a set being aligned to engage a single track when the skid is mounted on the carrier. Fixed position rollers 40 also provide a wheeled skid when the skid is removed from the carrier and placed on some supporting surface, such as a loading dock.

Recessed tracks or grooves 36 are adapted to engage with retractable or yieldable guide means diagrammatically illustrated at 42 in FIGURE 1. The yieldable guide means are connected in several sets to the bottom 24 of the skid. All the guide means in one set are adapted to engage a single recessed track 36. The guide means 42 are normally urged in a direction opposite to the planar bottom 24 of the skid, and this will assure engagement of guide means 42 and track 36. The adjustable relationship between guide means 42 and track 36 will likewise allow engagement of the fixed position rollers 40 and the planar track 32. The yieldability of guide means 42 will also not interfere with ground or supporting surface contact of the wheels 40. The yieldability of the guide means 42 is an important feature which leads to quick and certain mounting and dismounting of the skid.

The guide means 42 are shown as retractable wheels in FIGURES 2 and 3, but a roller construction is merely preferred and not essential. Other yieldable members would be operable such as rods of various cross sectional configuration, plates, knobs and the like. The important feature is that such guide means be yieldable in a direction substantially normal to the plane of the bottom wall.

The representative yieldable wheel is shown as having spaced bracket members 46 and 48 which may be secured to top wall 16 and to an I beam such as 14 by welds 50 and 52 or the like. Each bracket has a keyway slot such as 54 in bracket 46. The roller assembly includes a wheel 56 rotatable around an axle 57. Keys or sliders 58 and 60 are integral with the axle and are reciprocable in the keyway slots. Above the wheel, transverse member 62 is rigidly fixed at its opposite ends to the spaced sliders by welds such as 64. A stub shaft 66 is integral with transverse member 62 and its opposite free end 68 is disposed within bore 70 of annular member 72 which depends from top wall 16. A spring 74 has one final turn against the transverse member 62 and its other final turn against the end of the continuous wall of the annular member 72. The spring urges the wheel 56 outwardly to engage track 36, but is yieldable in the opposite direction or inwardly in response to the load of the skid itself and to the weight of loads placed on the skid. The outward displacement of the wheel 56 is limited by stops 76 and 78 fixed to the bottom of the brackets by means such as welds 80. Such stops will intercept the downward travel of the sliders and wheel axle.

The skid may have means 79 and 81 on a side 28a to laterally secure the skid against sway or displacement. Such means may be rollers which are closely adjoined to the side walls of a carrier housing. Such rollers may be urged outwardly by spring arrangements similar to those described in association with guide means 42. While the skid is being mounted on the carrier, such rollers will engage the side walls and retract in accordance with the gap between the side wall of the carrier housing and the sidewall of the skid. The foregoing further facilitates mounting of the skid.

Means generally shown as 83 may be provided for interlocking the skid to the floor portion of the carrier to hold the carrier against undesirable lateral and vertical movement. One such means is shown in greater detail in FIGURE 5 where the floor portion 30 of the carrier has an opening defined by lips 82, 85, which opening leads to a keyway slot 84 slidably engage a T-shaped keyway slide 86 depending in fixed relationship from the bottom of the wall of the skid 16. At least on end of such a keyway slot would remain open to receive the key slide when mounting the skid on the carrier.

The skid may also be provided with braking means shown generally as 89 against longitudinal and transverse movement; and such means is shown as a snap down brake in FIGURE 4. An arm 90 is rotatable around a pivot 92 which may be fixed to the bottom flange 94 by means which are not shown. The inactive position of the arm is indicated in phantom. When the arm is turned down as shown in solid line, the serrations 96 on the end will engage the floor 98 and frictionally resist displacement in a direction coincidental with the end of the arm when said arm is parallel with the plane of the floor portions 98. A plurality of such arms variously placed on the skid will also tend to resist correspondingly directed displacements.

Some of the foregoing embodiments will operate to resist undesirable displacement, but side to side sway may be a more serious problem with heavy loads. An extensible side wall arrangement in a skid will be desirable for such problems, and an embodiment therefore is shown in FIGURE 7. The skid has a top wall 100 and a bottom wall 102 fixed to the flanges of an I beam 104. The extensible side wall assembly includes an elongated sidewall 106 having a planar surface adapted to press against a sidewall 108 of a carrier housing. Integral with sidewall 106 is a transversely extending and cantilever rack 110 of sufficient length to desirably extend the sidewall. The sidewall assembly is supported by a lower extension member 112 which extends in cantilever fashion and slides transversly in passageway 114 of a guide tube 116 which is shown fixed to the I beam by welds at 118 and 120. Extension member 112 is of sufficient length to accommodate the greatest extension of the rack 110. A gear 122 may be rotated by a hand lever or the like (not shown) to actuate the rack and press the sidewall of the skid against the sidewall 108 of the housing. The sidewall may be beveled as at 124 and 126 to lie against the tapered faces 128 and 130 of, respectively, the top and bottom flanges of the I beam when the sidewall assembly is in the fully closed or non-extended position.

Two or more skids may be releasably interlocked along adjoining side walls where a carrier can accommodate a plurality of such skids. FIGURE 6 shows a locking disc or plate 132 extending from an I beam 134 along a sidewall 136 of one skid. Another skid is represented by 138. When both skids are aligned so the opposite sidewalls of both skids are coplanar, plate 140 of skid 138 will be in staggered relationship to plate 132. Openings 142 and 144 of the plates will then be registered and a pin or the like may be inserted to interlock the adjoining skids. An edge of a palette body may have a plurality of such interlocking discs. The side to side interlock will be particularly desirable when two or more skids are longitudinally aligned to form a chain, although such a linkage could be used for a lateral side to side interlock if desired.

In use, a load may be placed and secured on the skid while it is on a supporting surface or after it has been mounted on the carrier. In any event, the skid may be raised to the floor portion of the carrier by any raising device such as a hydraulic lift fork, a hydraulic jack, and the like. The loaded skid is raised to the level of the carrier floor portion so the rolling and guide means on the bottom of the skid are aligned with their appropriate tracks. Once the skid is aligned with the tracks, particularly the recessed tracks, the skid is quickly and smoothly mounted on the carrier by any convenient pushing or pulling means such as a cable winch, jeep or the like. The yieldable guide means will positively guide the skid onto the floor portion and permit the fixed position wheels on the skid to engage the planar tracks to facilitate rolling movement of the skid onto the carrier.

After the skid is mounted, it may be secured against back and forth and side to side sway by means such as those previously described. Or one or more additional skids may be mounted and all the skids linked or interlocked in the manner previously described.

Following transport of the loaded skid to the point of delivery, the skid may be conveniently pushed or pulled out of the carrier by means such as those described, and placed onto a lowering means such as a lift fork, hydraulic tailgate, elevator, or other means.

The disclosed skid and carrier assembly is particularly useful and advantageous for delivery of heavy comestible loads to supermarkets, chainstores, and for delivery of dry goods to large merchandising stores which have become very popular in shopping centers and the like. Delivery of heavy loads to such places and speedy unloading is very desirable to get the load into stock and to more quickly free personnel from the task of unloading. Such points of delivery could have specific portable docks and elevator docks to even more quickly dismount the loaded skid.

If desired, the top side of the skid may have a plurality of recessed tracks from front to back, and such tracks could be positioned to receive the fixed position wheels, for example, on the bottom side of another like skid. This would permit stacking of a number of unloaded skids in a carrier with or without a floor portion provided wtih tracks. The top side may also be provided with appropriately spaced wells or notches to receive the fixed position wheels of an upper skid.

It will be realized that the loads may be secured to the skids by conventional and known means such as straps, retaining hooks and the like. The simplicity of the skid receiving surface allows loads to be boxed, tarp covered and to be treated in various other ways.

The edge-to-edge interlock of skids may be used to advantage on railroad freight cars where long chains of loaded skids may be mounted. Flat bed freights may be used as well as freight housing cars which preferably have a door at the end of the car to realize speedy loading and unloading. A truck carrier can deliver a loaded skid to a railroad carrier, transfer the load, and then be available for further use. The same truck carrier may make several deliveries to a railroad carrier which cuts down on the number of carriers required for a particular load.

The invention may now be practiced and such practitioners will know that such invention should not be restricted to the particular embodiments described but should be limited only by the terms of the following claims as given further meaning in the preceding description.

I claim:

1. A skid adapted to be mounted, secured and removed from a carrier which includes in combination, a palette body, said palette body having a top side adapted to receive and discharge loads, a bottom side, and side edges joining said top and bottom sides, a plurality of fixed position rolling means on said bottom side, palette guide means mounted on said bottom side, said palette guide means being adapted to engage cooperating guide means on said carrier, said palette guide means including yieldable means allowing said palette guide means to accommodate to guiding engagement with the carrier guide means, whereby said palette body is adapted to be positively guided onto said carrier with all the rolling means in rolling engagement with the carrier, said palette having an extensible side edge movable away from said top and bottom sides, extensible means joined to said side edge, and means to selectively actuate said extensible means so that said side edge may contact one of said fixed opposite surfaces of said carrier.

2. A skid as in claim 1 in combination with a carrier further characterized in that the carrier housing has fixed opposite surfaces, and said surfaces are spaced so that they closely adjoin the side edges of the skid when said skid is mounted on the carrier.

3. A skid as in claim 2 in combination with a carrier further characterized in that opposite side edges of said skid have yieldable rollers, means to urge said rollers outwardly, and said rollers being adapted to retract into the palette body when they rollingly engage the fixed surfaces of the trailer housing during mounting and removal of the skid therefrom.

References Cited

UNITED STATES PATENTS

| 1,124,273 | 1/1915 | Bernheim | 104—245 XR |
| 2,820,560 | 1/1958 | Davis. | |
| 2,985,479 | 5/1961 | Ortega et al. | 104—243 XR |

GERALD M. FORLENZA, Primary Examiner

FRANK E. WERNER, Assistant Examiner

U.S. Cl. X.R.

104—245